US 6,539,808 B2

(12) United States Patent
Saenz et al.

(10) Patent No.: US 6,539,808 B2
(45) Date of Patent: Apr. 1, 2003

(54) PRESS-FIT REMOTE DIAPHRAGM ASSEMBLY

(75) Inventors: Olaiz A. Saenz, Houston, TX (US); Jon R. Schroeder, Maple Grove, MN (US)

(73) Assignee: P I Components Corporation, Brenham, TX (US)

( * ) Notice: Subject to any disclaimer, the term of this patent is extended or adjusted under 35 U.S.C. 154(b) by 0 days.

(21) Appl. No.: 09/977,104

(22) Filed: Oct. 12, 2001

(65) Prior Publication Data

US 2002/0014123 A1 Feb. 7, 2002

Related U.S. Application Data (63) Continuation-in-part of application No. 09/504,990, filed on Feb. 15, 2000.

(51) Int. Cl.$^7$ ................................................. G01L 7/00
(52) U.S. Cl. ........................................................ 73/756
(58) Field of Search ........................... 73/756, 715, 700; 361/283; 251/40; 92/100

(56) References Cited

U.S. PATENT DOCUMENTS

| | | | |
|---|---|---|---|
| 3,633,605 A | 1/1972 | Smith | 137/113 |
| 4,466,339 A * | 8/1984 | Huddle | 92/100 |
| 4,626,636 A | 12/1986 | Hickman et al. | 200/83 |
| 4,745,810 A | 5/1988 | Pierce et al. | 73/706 |
| 5,232,194 A * | 8/1993 | Saadi et al. | 251/40 |
| 5,236,202 A | 8/1993 | Krouth et al. | 277/164 |
| 5,328,005 A | 7/1994 | Van Breemen | 188/322.21 |
| 6,131,468 A | 10/2000 | Sich et al. | 73/756 |
| 6,401,546 B1 * | 6/2002 | Kocian et al. | 73/756 |

FOREIGN PATENT DOCUMENTS

EP     0 498 206     8/1992

OTHER PUBLICATIONS

U.S. patent application Ser. No. 09/504,990, Kocian et al., filed Feb. 15, 2000.

* cited by examiner

*Primary Examiner*—Hezron Williams
*Assistant Examiner*—Andre Allen
(74) *Attorney, Agent, or Firm*—Westman, Champlin & Kelly (57) ABSTRACT

A press-fit remote diaphragm assembly includes a diaphragm member and a mounting portion which can be press-fit assembled by hand and without the use of tools. The diaphragm member includes a flexible diaphragm and a first press-fit member receiving portion. The mounting portion includes a second press-fit member receiving portion. The first and second press-fit member receiving portions align to form a press-fit member cavity which contains a press-fit member. The press-fit member engages the first and second press-fit member receiving portions to couple the diaphragm member to the mounting portion.

14 Claims, 9 Drawing Sheets

PRESS-FIT REMOTE DIAPHRAGM ASSEMBLY

This application is a continuation-in-part of U.S. application Ser. No. 09/504,990 filed Feb. 15, 2000 and entitled "PRESS-FIT REMOTE DIAPHRAGM ASSEMBLY."

BACKGROUND OF THE INVENTION

The present invention relates to a remote diaphragm assembly for use in the process control industry to couple a process control instrument to a process. More particularly, the present invention relates to a remote diaphragm assembly whose components are easily assembled via a press-fit connection.

Sometimes it is necessary to separate a process device, such as a pressure transmitter, from a process medium it is to measure. This may occur, for example, because the process medium is hazardous to the process device (corrosive, extremely hot, etc.) or inaccessible to the process device. In that case, a remote diaphragm assembly can be used to couple the process device to the process medium while the process device is located a safe distance away.

Remote diaphragm assemblies typically include a flexible diaphragm that couples a diaphragm seal of a pressure transmitter to the process medium contained in a process vessel via a capillary tube. The capillary tube may extend for several meters to safely separate the process device from the process. The capillary tube is filled with a fill fluid that is substantially incompressible and completely fills the cavities between the flexible diaphragm and the diaphragm seal. The diaphragm of the remote diaphragm assembly interfaces with the process medium through a process flange to which it is mounted and flexes in response to the pressure of the process medium. These flexes are transmitted through the fill fluid to the diaphragm seal of the process device. The resulting flexes of the diaphragm seal are then transmitted in a similar fashion to a sensor contained within the process device which produces a signal relating to the pressure of the process medium in response thereto.

The interface between the remote diaphragm assembly and the process flange is generally in accordance with a standard, such as the American National Standards Institute (ANSI), Deutsche Industrie-Norm (DIN), Japanese Industrial Standard (JIS), International organization for Standardization (ISO), or other suitable standard. In order to accommodate the various interface standards, remote diaphragm assemblies often include separate diaphragm member and mounting portion components. The diaphragm member includes the thin flexible diaphragm and the mounting portion is adapted to secure the diaphragm member to the process flange of the process vessel.

The diaphragm member and the mounting portion are typically assembled prior to mounting to the process flange. Current methods for assembling these components include the use of screws, welded retaining rings, interference fit via knurled surfaces, and other similar fastening techniques. These fastening techniques can lead to increased manufacturing costs due to the complexity of the machining and/or labor that is required to form the components. Additionally, these fastening methods require the use of additional equipment and/or a skilled technician to assemble the components of the remote diaphragm assembly, which further increases manufacturing costs.

SUMMARY OF THE INVENTION

The present invention is directed to a remote diaphragm assembly, for use in the process control industry, which includes a diaphragm member and a mounting portion which can be press-fit assembled. This press-fit feature relates to the ability to securely assemble the diaphragm member and the mounting portion together by hand (i.e. without the use of tools, screws, welds, etc.). The diaphragm member includes a flexible diaphragm and a first press-fit member receiving portion. The mounting portion includes a second press-fit member receiving portion, which, when aligned with the first press-fit member receiving portion, results in the formation of a press-fit member cavity that contains a press-fit member. The press-fit member engages the first and second press-fit member receiving portions to form a press-fit connection therebetween and couple the diaphragm member to the mounting portion. Also disclosed is a method for assembling the above-described remote diaphragm assembly. In the method, a diaphragm member and a mounting portion are provided. The diaphragm member includes a flexible diaphragm and a first press-fit member receiving portion and the mounting portion includes a second press-fit member receiving portion. Next, a press-fit member is secured within either the first or the second press-fit member receiving portion. Finally, the diaphragm member and the mounting portion are press-fit together, during which the press-fit member is temporarily compressed into an assembly position and then expanded into a locking position within a press-fit member cavity that is formed when the first and second press-fit member receiving portions are aligned.

DETAILED DESCRIPTION OF THE PREFERRED EMBODIMENTS

The present invention relates to a remote diaphragm assembly which can be quickly assembled by hand. The remote diaphragm assembly generally includes a diaphragm member, a mounting portion, and a press-fit member. As will be described in greater detail below, the press-fit member forms a press-fit connection between the diaphragm member and the mounting portion, which can be performed by hand and without the use of tools. The press-fit connection resists relative axial movement between the diaphragm member and the mounting portion in a disassembly direction that is opposite an assembly direction in which the diaphragm member and the mounting portion are press-fit together. Once press-fit assembled, the diaphragm member and the mounting portion remain connected during normal handling and installation of the remote diaphragm assembly. The press-fit feature is a significant improvement over prior art remote diaphragm assemblies which require the use of screws, welded retaining rings, or knurled surfaces to assemble the remote diaphragm assembly. In one embodiment, the press-fit connection provides high-resistance to the disassembly of the diaphragm member and the mounting portion.

Figure 1:
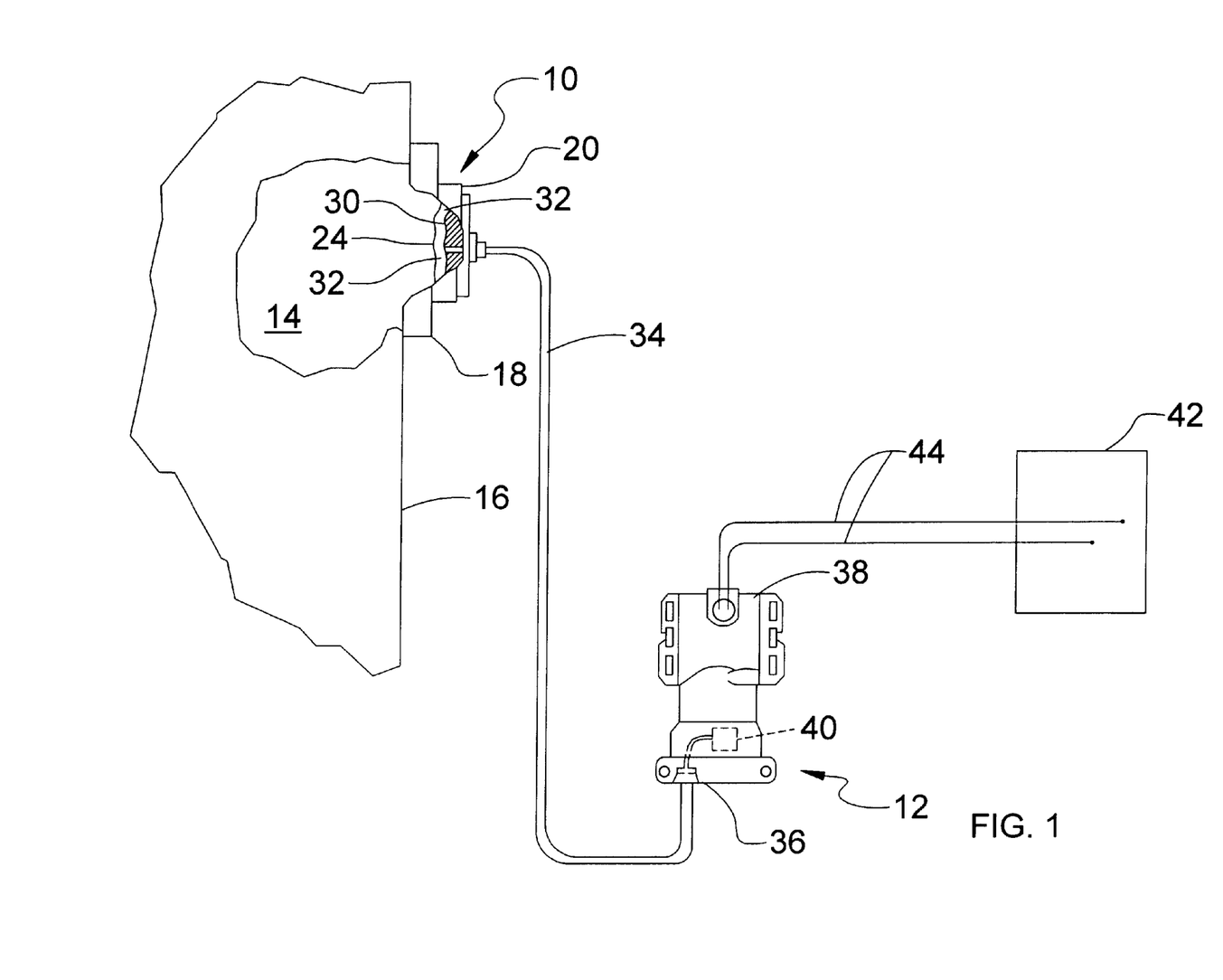
FIG. 1 is a simplified diagram showing a transmitter coupled to a remote diaphragm assembly in accordance with the present invention.
Figure 2:
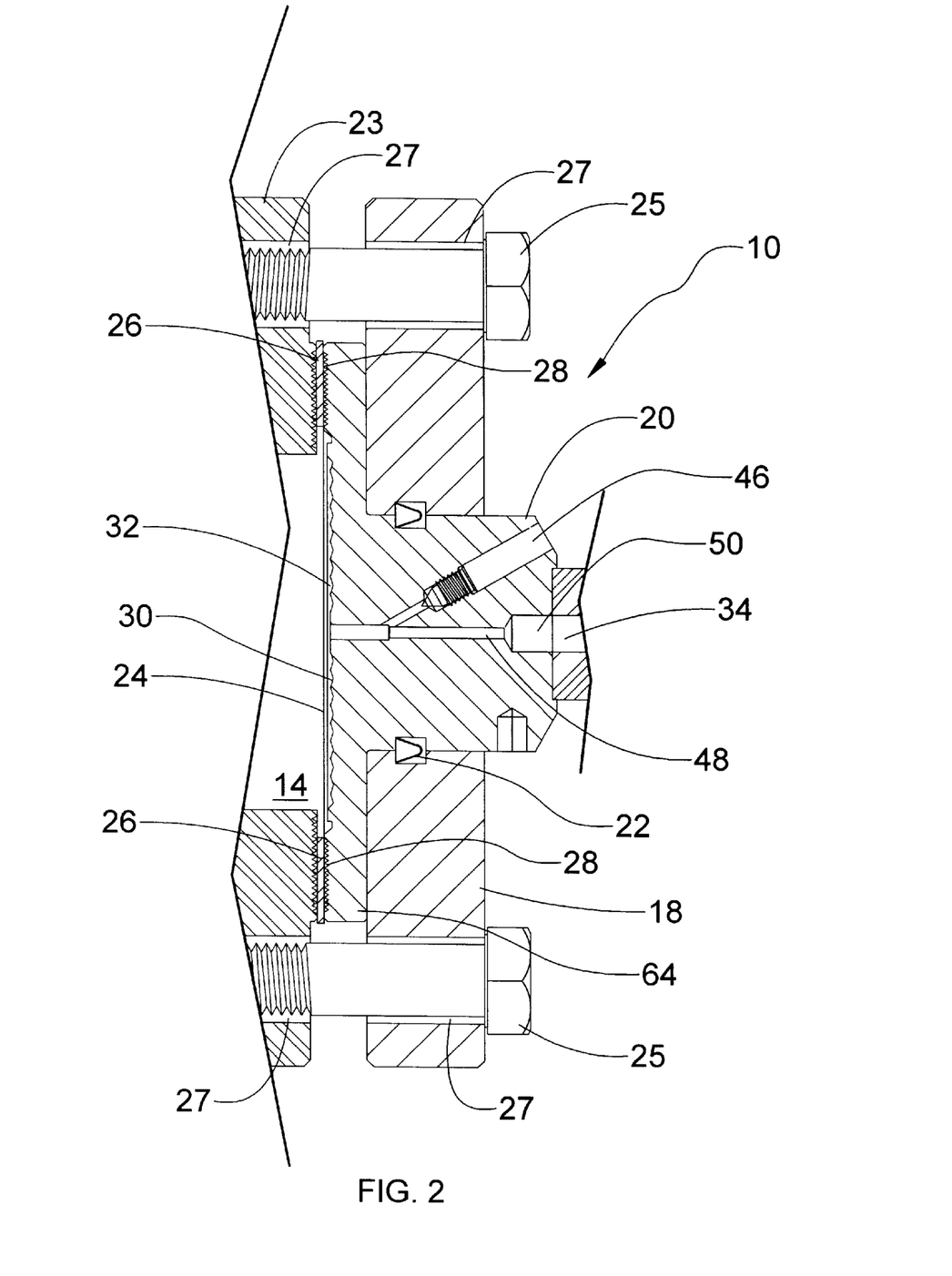
FIG. 2 is a side cross-sectional view of an installed remote diaphragm assembly in accordance with one embodiment of the invention.

FIGS. 1 and 2 illustrate an example of a remote diaphragm assembly 10, in accordance with the present invention, coupled to a process instrument 12 to communicate a pressure of a process medium 14 contained in a process vessel 16 to process instrument 12. Process instrument 12 can be a pressure transmitter, such as the 3051 Pressure Transmitter manufactured by Rosemount, Inc. of Eden Prairie, Minn. Process medium 14 could, for example, be a corrosive or an extremely hot process fluid, such that process instrument 12 is unable to contact, or operate in close proximity to, process medium 14.

Mounting portion 18 and a diaphragm member 20 are coupled together by a press-fit connection that is formed using a press-fit member 22. Once assembled, mounting portion 18 secures the remote diaphragm assembly 10 to a process flange 23 of vessel 16 using, for example, bolts 25 fed through corresponding bores 27 of mounting portion 18 and process flange 23 or other suitable mounting adapter. Process flange 23 can be, for example, a standard ANSI flange, and provides fluid communication between a thin flexible diaphragm 24 and process medium 14. A gasket or other seal 26 can be sandwiched between a process port interface 28 of diaphragm member 20 and process flange 23 to prevent process fluid from escaping.

Diaphragm 24 and a backplate 30 define a cavity 32 whose volume changes as diaphragm 24 flexes in response to the pressure of process medium 14. A capillary tube 34 fluidically couples cavity 32 to a transmitter diaphragm 36 in a transmitter housing 38. Cavity 32 and capillary tube 34 are filled with a substantially incompressible fill fluid for transmitting the volume changes of cavity 32 caused by the flexing diaphragm 24 to transmitter diaphragm 36, which flexes in response thereto. The fill fluid may include silicone, oil, glycerin and water, propylene glycol and water, or any other suitable fluid which preferably is substantially incompressible. The responsive flexing of transmitter diaphragm 36 is communicated to a sensor 40 contained in transmitter housing 38 and is used to determine the pressure in vessel 16. Sensor 40 can be a capacitance-based pressure cell, in which the capacitance of sensor 40 changes as a function of the pressure of process medium 14, or operate on other known sensing principles, such as strain gauge technology. Sensor 40 produces a pressure signal, based upon the flex of transmitter diaphragm 36, that is indicative of the pressure of process medium 14. Circuitry within transmitter housing 38 communicates the pressure signal to process control circuitry 42 over, for example, wires 44 in accordance with known methods.

Figure 3:
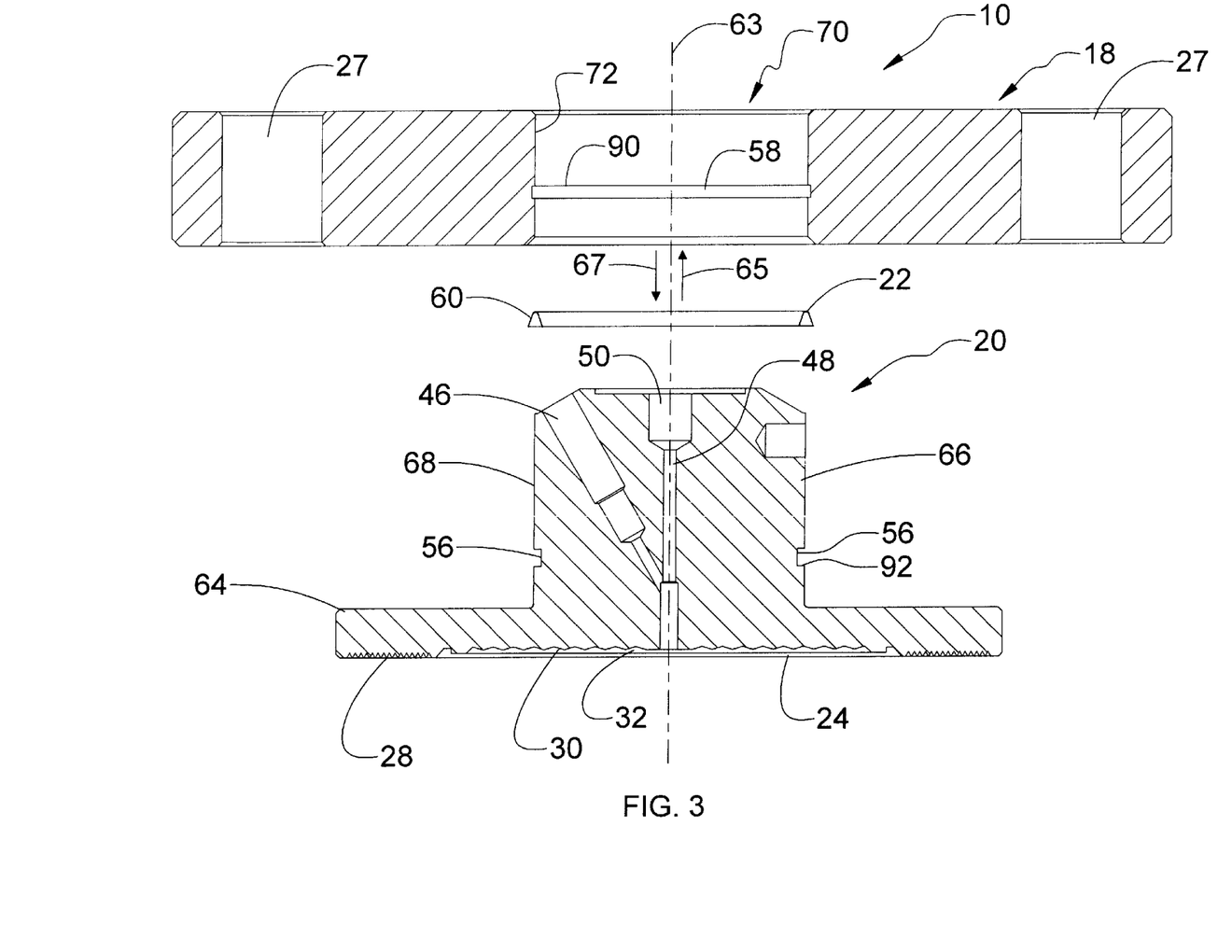
FIG. 3 is an exploded side cross-sectional view of a remote diaphragm assembly in accordance with one embodiment of the invention.
Figure 4:
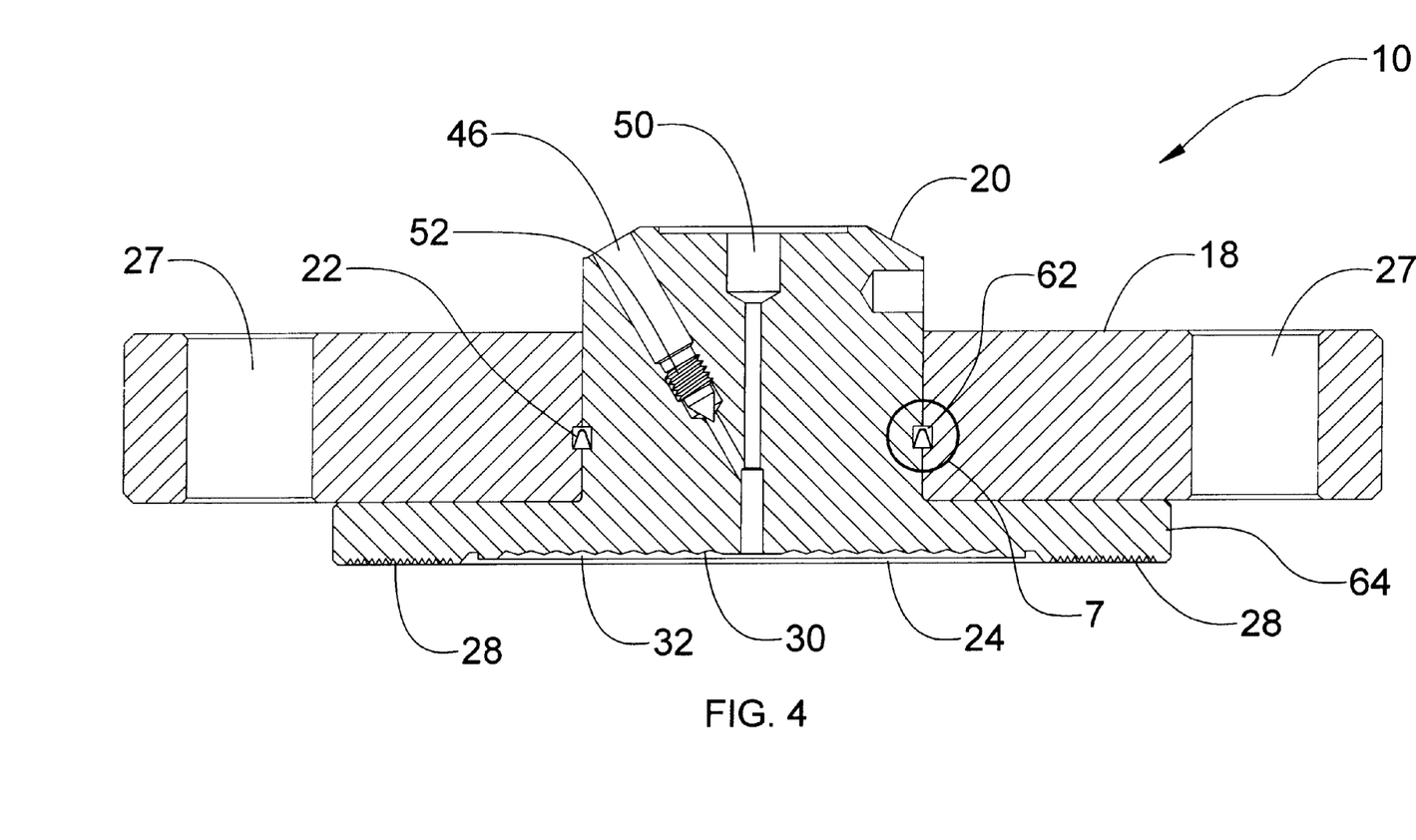
FIG. 4 is a side cross-sectional view of an assembled remote diaphragm assembly in accordance with one embodiment of the invention.

Referring now to FIGS. 3 and 4, a more detailed discussion of the various embodiments of the invention will be provided. FIG. 3 is an exploded side cross-sectional view of remote diaphragm assembly 10 and FIG. 4 is a side cross-sectional view of an assembled remote diaphragm assembly 10. As mentioned above, remote diaphragm assembly 10 generally includes diaphragm member 20, mounting portion 18, and press-fit member 22. Diaphragm member 20 and mounting portion 18 are preferably formed of a corrosion-resistant material, such as stainless steel. Diaphragm member 20 can include a fluid fill port 46, a fluid passageway 48, and a tube port 50. Fill fluid can be added to cavity 32 through fluid fill port 46. A suitable plug 52 (shown in FIG. 4) can be used to prevent fill fluid from escaping port 46.

Diaphragm member 20 and mounting portion 18 include first and second press-fit member receiving portions 56 and 58, respectively, which are generally configured to receive a portion of press-fit member 22 and to engage at least a portion of exterior surface 60 of press-fit member 22. First and second press-fit member receiving portions 56 and 58, form a press-fit member cavity 62 when aligned, as shown in FIG. 4. Press-fit member 22 is adapted to occupy press-fit member cavity 62 to provide the press-fit connection between diaphragm member 20 and mounting portion 18. The press-fit connection restricts the relative movement of diaphragm member 20 and mounting portion 18 along axis 63.

A positioning flange 64 of diaphragm member 20 limits the axial movement of diaphragm member 20 relative to mounting portion 18 in an assembly direction indicated by arrow 65 in FIG. 3. When remote diaphragm assembly 10 is press-fit assembled, positioning flange 64 contacts mounting portion 18 and causes first and second press-fit member receiving portions 56 and 58 to align and form press-fit member cavity 62 as shown in FIG. 4.

In one embodiment, diaphragm member 20 includes a first cylindrical portion 66 having an exterior surface 68 on which first press-fit member receiving portion 56 is formed. Mounting portion 18 includes an opening 70, defined by an interior surface 72, on which second press-fit member receiving portion 58 is formed. In one embodiment, first and second press-fit member receiving portions 56 and 58 are annular grooves, which can be formed using conventional machining techniques. The cylindrical opening 70 has an inner diameter that is slightly larger than the outer diameter of first cylindrical portion 66. As a result, second cylindrical portion 70 can receive first cylindrical portion 66 for alignment of first and second press-fit member receiving portions 56 and 58 to form press-fit member cavity 62.

First and/or second cylindrical portions 66 and 70 can include a guide surface, such as guide surface 74 of first cylindrical portion 66, to aide in the assembly of remote diaphragm assembly 10 by guiding the insertion of first cylindrical portion 66 into second cylindrical portion 70. One embodiment of guide surface 74 is annularly shaped and angled to assist in the axial alignment of diaphragm member 20 and mounting portion 18. Embodiments of the present invention include configurations where one or both diaphragm member 20 and mounting portion 18 include guide surfaces 74.

Figure 5A:
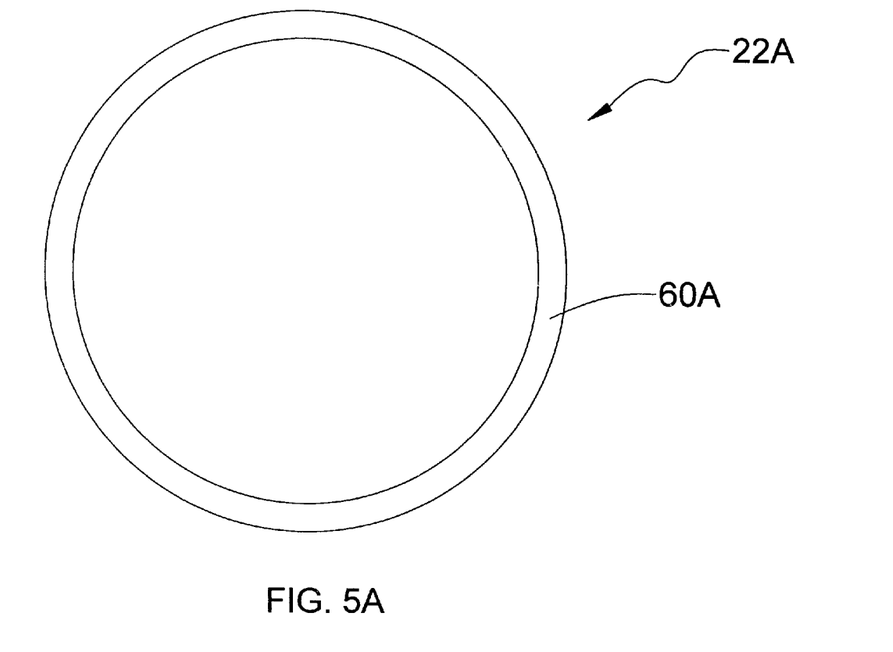
FIGS. 5A–B are top plan views of press-fit members in accordance with various embodiments of the invention.
Figure 5B:
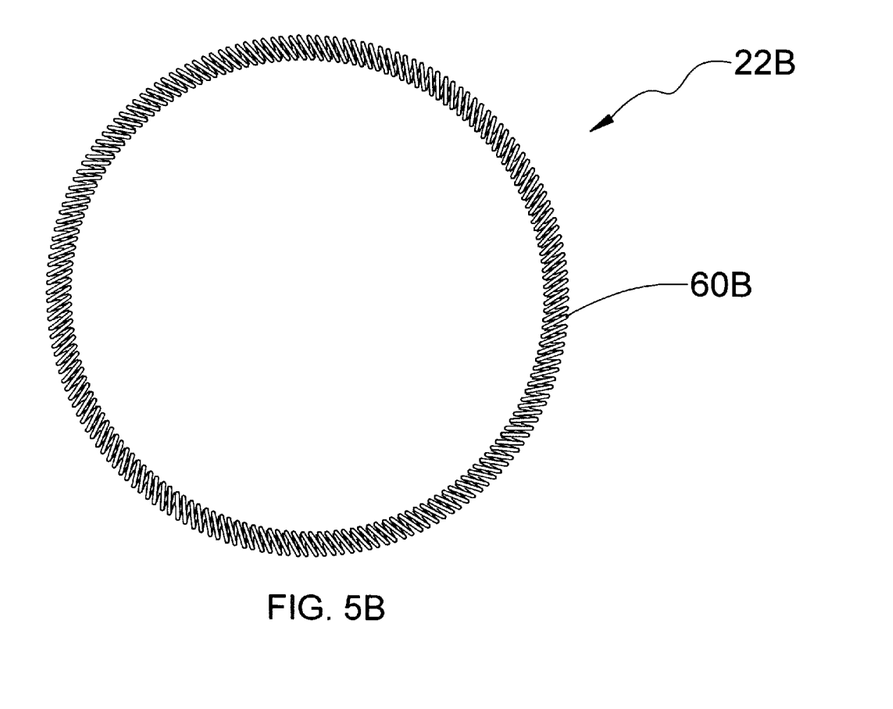

Press-fit member 22 is preferably annularly shaped, compressible, formed of a corrosion-resistant material, and configured to expand within the press-fit member cavity 62 when first and second press-fit member receiving portions 56 and 58 are aligned. One embodiment of press-fit member 22, provides low-resistance assembly and disassembly of remote diaphragm assembly 10. Examples of suitable press-fit members 22 in accordance with this one embodiment are shown in FIGS. 5A and 5B. FIG. 5A shows a press-fit member 22A configured as a solid or hollow O-ring that is preferably formed of an elastomeric material. This embodiment of press-fit member 22 can provide additional leakage protection for remote diaphragm assembly 10 if needed. The cross-sectional shape of press-fit member 22A can be circular, oval, octagonal, square, triangular, or any other shape that will operate to provide the desired press-fit connection by expanding within press-fit member cavity 62. FIG. 5B shows a press-fit member 22B in accordance with another embodiment of the invention. Press-fit member 22B is an annular spring, which can be formed by connecting the ends of a conventional spring together. These embodiments of press-fit member 22 allow remote diaphragm assembly 10 to be both assembled and disassembled by hand.

Figure 6A:
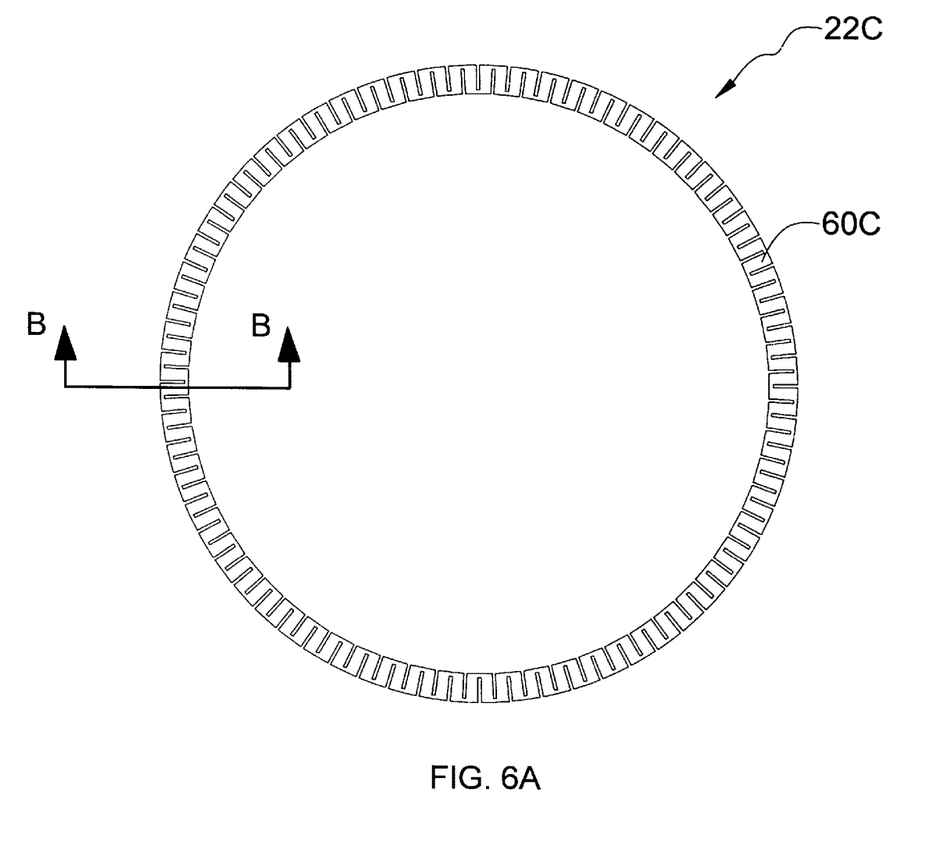
FIGS. 6A–B are top and cross-sectional (taken along line B—B of FIG. 6A) views, respectively, of a press-fit member in accordance with an embodiment of the invention.
Figure 6B:
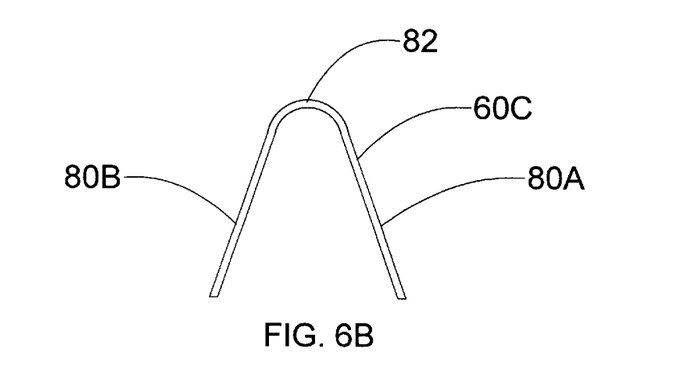

Another embodiment of press-fit member 22 allows for the easy, low-resistance, press-fit assembly of diaphragm member 20 and mounting portion 18 while, once assembled, providing high-resistance to their disassembly. FIGS. 6A and 6B show top and cross-sectional views, respectively, of one embodiment of such a press-fit member 22C. Here, press-fit member 22C is an annular member having a "V" shaped cross section formed by inside and outside leg members 80A and 80B, respectively, which are joined at vertex 82. Press-fit member 22C is preferably formed of a corrosion-resistant material such as stainless steel. The "easy on" and "hard off" features of this embodiment of press-fit member 22 will be discussed in greater detail below with respect to the method of assembling remote diaphragm assembly 10. Those skilled in the art understand that other suitable press-fit members 22 can be used, such as a spring clip (i.e., a split solid ring), to provide the desired press-fit connection between diaphragm member 20 and mounting portion 18.

The press-fit assembly of remote diaphragm assembly 10 begins by securing a portion of press-fit member 22 to either first or second press-fit member receiving portion 56 or 58. In one embodiment, press-fit member 22 is adapted to stretch around exterior surface 68 of first cylindrical portion 66, such that a portion of press-fit member 22 securely rests within the corresponding first or second press-fit member receiving portion 56 or 58. Alternatively, press-fit member 22 could be configured to exert a radially directed force against interior surface 72 of second cylindrical portion 70 such that it becomes secured within the corresponding second press-fit member receiving portion 58.

Figure 7A:
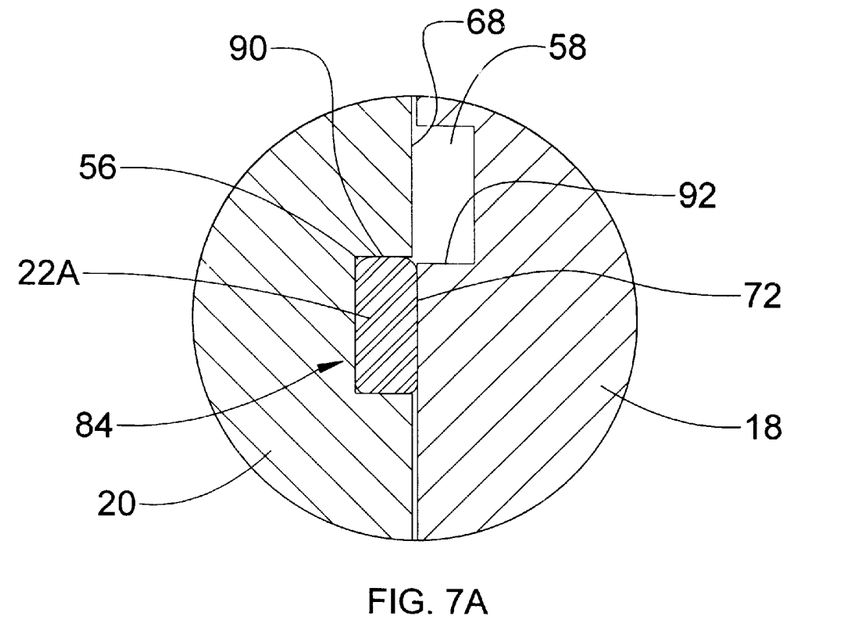
FIGS. 7A and 7B are magnified views of a portion of a remote diaphragm assembly contained within approximately circle 7 of FIG. 4 during various stages of assembly using a press-fit member in accordance with one embodiment of the invention.
Figure 7B:
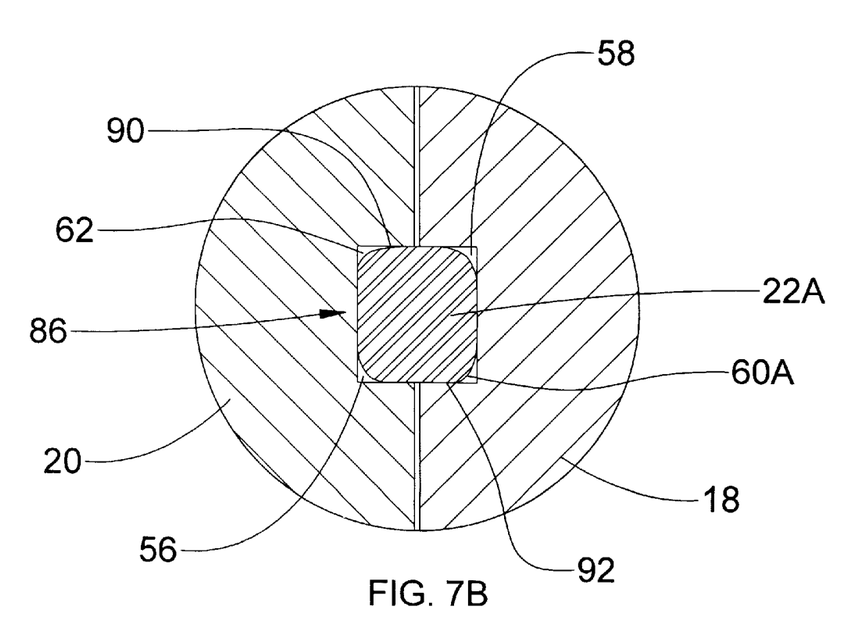
Figure 8A:
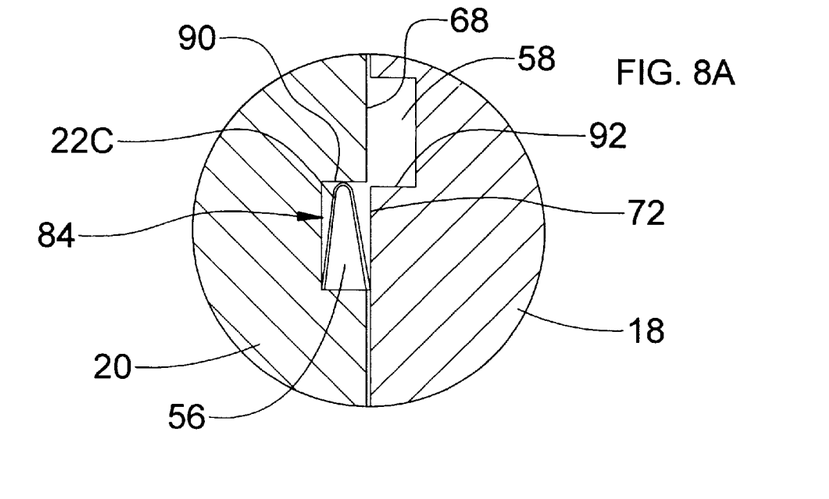
FIGS. 8A–8C are magnified views of a portion of a remote diaphragm assembly contained within approximately circle 7 of FIG. 4 during various stages of assembly using a press-fit member in accordance with one embodiment of the invention.
Figure 8B:
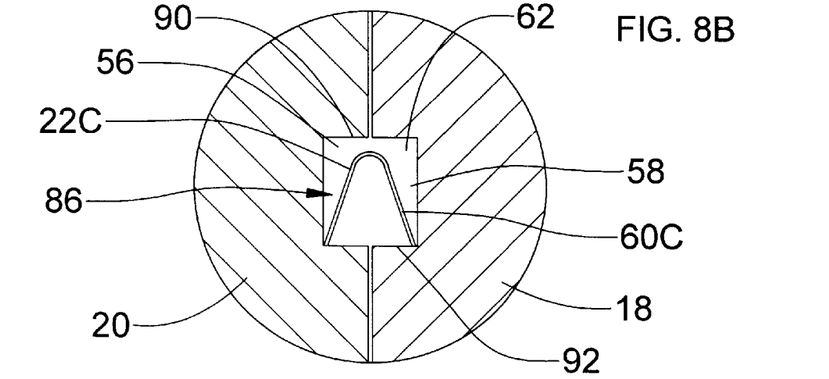
Figure 8C:
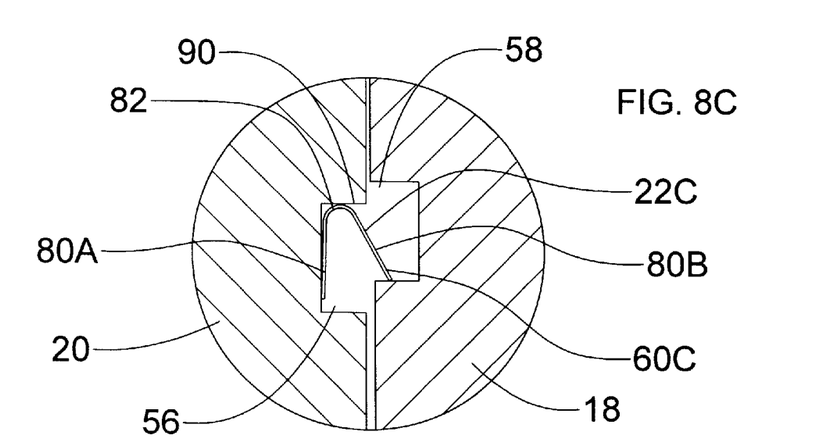

FIGS. 7A, 7B, and 8A–8C are magnified views of a portion of remote diaphragm assembly 10 contained within approximately circle 7 of FIG. 4 during subsequent stages of the press-fit assembly of remote diaphragm assembly 10. FIGS. 7A and 7B illustrate the press-fit assembly using press-fit member 22A (FIG. 5A) and FIGS. 8A–8C illustrate the press-fit assembly using press-fit member 22C (FIGS. 6A and 6B). With the press-fit member 22 secured to first press-fit member receiving portion 56, first cylindrical portion 66 of diaphragm member 20 is inserted into second cylindrical portion 70 of mounting portion 18 in assembly direction 65 (FIG. 3). This process causes press-fit members 22A and 22C to temporarily compress into an assembly position 84 between first press-fit member receiving portion 56 and surface 72, as shown in FIGS. 7A and 8A, respectively. Assembly position 84 of press-fit members 22A and 22C provides low-resistance to relative axial movement between diaphragm member 20 and mounting portion 18.

As diaphragm member 20 continues to move in the assembly direction 65 relative to mounting portion 18, first and second press-fit member receiving portions 56 and 58 eventually align to form press-fit member cavity 62 and allow press-fit members 22A and 22C to expand therein into a locking position 86, as shown in FIGS. 7B and 8B. When in the locking position 86, exterior surfaces 60A and 60C of press-fit members 22A and 22C, respectively, engage first and second press-fit receiving portions 56 and 58 to form the press-fit connection. For press-fit member 20A, the locking position 86 inhibits or resists movement of diaphragm member 20 along axis 63 in disassembly direction (indicated by arrow 67 of FIG. 3) relative to mounting portion 18 due to the portions of exterior surface 60A that engage shoulders 90 and 92 of first and second press-fit member receiving portions 56 and 58, respectively, pinching press-fit member 22A therebetween. The resistance to the disassembly of remote diaphragm assembly 10 provided by press-fit member 22A when in the locking position 86 depends in part on the size, shape, and material used to form press-fit member 22A, and the size and shape of first and second press-fit member receiving portions 56 and 58. Thus, the resistance can be made low to allow remote diaphragm assembly 10 to be disassembled by hand or high to restrict such disassembly by hand.

When press-fit member 22C is in the locking position 86, it provides high-resistance to the movement of diaphragm member 20 along axis 63 in a disassembly direction 67 relative to mounting portion 18. This is illustrated in FIG. 7C in which exterior leg member 80B engages shoulder 92 of second press-fit member receiving portion 58 and vertex 82 of press-fit member 22C engages shoulder 90 of first press-fit member receiving portion 56. The continued movement of diaphragm member 20 in the disassembly direction 67 relative to mounting portion 18 compresses exterior leg member 80B, which provides the desired high-resistance to the disassembly of remote diaphragm assembly 10. The amount of resistance that is provided depends in part on the particular size, shape and material used to form press-fit member 22C, and the size and shape of first and second press-fit member receiving portions 56 and 58. In one embodiment, press-fit member 22C provides sufficiently high resistance to prevent the disassembly of remote diaphragm assembly 10 without the use of additional tools or machinery when in the locking position 86. This prevents tampering of remote diaphragm assembly 10 once it is assembled. On the other hand, when press-fit members 22A and 22B are used to press-fit assemble remote diaphragm assembly 10, remote diaphragm assembly 10 can be adapted to be both assembled and disassembled by hand.

Figure 9:
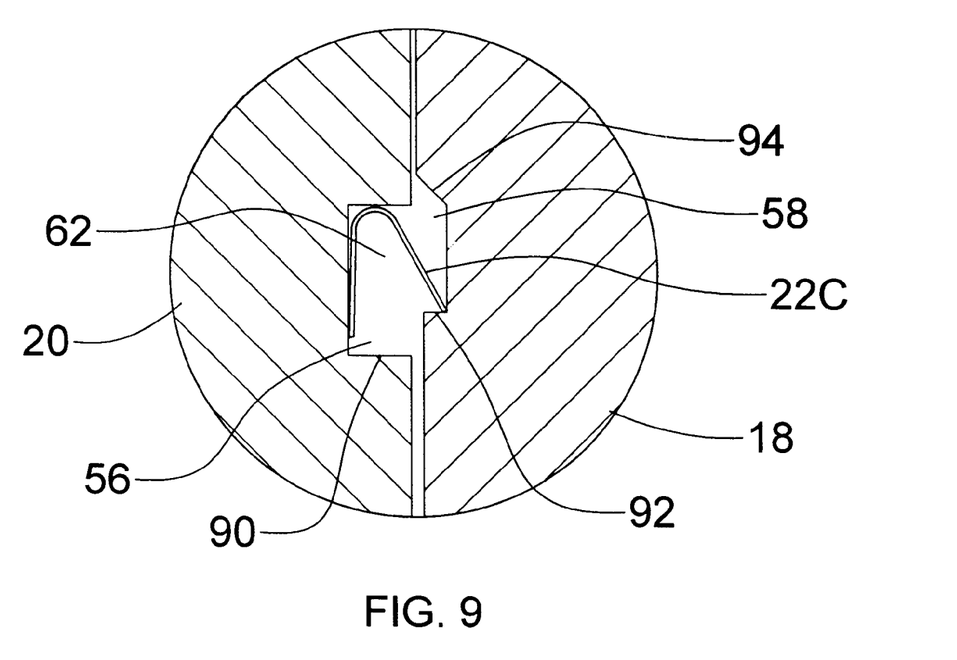
FIG. 9 is a magnified view of a portion of a remote diaphragm assembly contained within approximately circle 7 of FIG. 4 in accordance with an embodiment of the invention.

The first and second press-fit member receiving portions 56 and 58 can be formed of different shapes than the depicted square annular grooves of FIGS. 3, 7A–B, and 8A–C and still provide the desired function of forming the press-fit member cavity 62 when aligned. In particular, it is not necessary that the first and second press-fit member receiving portions 56 and 58 be formed symmetric to one another or have the same shape. For example, first press-fit member receiving portion 56 can be formed as a square annular groove while second press-fit member receiving portion 58 includes a square shoulder 92 having a smaller depth than shoulder 90 of first press-fit member receiving portion 56 and a beveled upper shoulder 94, as shown in FIG. 9. First and second press-fit member receiving portions 56 and 58 can take these and many other forms and still provide the desired function of forming the press-fit member cavity 62 when aligned such that the press-fit member 22 is allowed to expand therein and couple diaphragm assembly 20 to mounting portion 18.

The press-fit connection between diaphragm member 20 and mounting portion 18 can be adapted to resist rotation of diaphragm member 20 and mounting portion 18 relative to one another due to frictional resistance between exterior surface 60 of press-fit member 22 and first and second press-fit member receiving portions 56 and 58. The amount of frictional resistance depends on the amount press-fit member 22 is compressed within press-fit member cavity 62 and the material used to form press-fit member 22. This frictional resistance can preferably be overcome by hand to allow for adjustment to the alignment of diaphragm member 20 relative to mounting portion 18. This feature allows the components of remote diaphragm assembly to be aligned to connect to a drain, vent valve, etc.

Although the press-fit remote diaphragm assembly of the present invention has been described with reference to various embodiments, workers skilled in the art will recognize that changes may be made in form and detail without departing from the spirit and scope of the invention. For example, the press-fit member could take the form of a plurality of separate press-fit member portions, rather than a continuous annular member, which are angularly displaced from each other and secured to the first and/or the second press-fit member receiving portions. Additionally, the first and second cylindrical portions could be configured to have different shapes than those shown provided that they allow the diaphragm member and the mounting portion to mate together such that the press-fit member receiving cavity can be formed.

What is claimed is:

1. A remote diaphragm assembly for use in coupling a pressure of a process vessel to a process instrument, the process vessel including a process flange and a process port that provides access to the pressure, the remote diaphragm assembly comprising:

a diaphragm member including a flexible diaphragm and a first press-fit member receiving portion;

a mounting portion adapted to secure the diaphragm member to the process flange and place the diaphragm in fluid communication with the process port, and having a second press-fit member receiving portion aligned with the first press-fit member receiving portion to thereby form a press-fit member cavity; and a press-fit member positioned within the press-fit member cavity for engagement with the first and second press-fit member receiving portions thereby forming a press-fit connection between the diaphragm member and the mounting portion.

2. The remote diaphragm assembly of claim 1, wherein the diaphragm member or the mounting portion includes a process port interface adapted to seal the process port.

3. The remote diaphragm assembly of claim 1, wherein:

the diaphragm member includes a cylindrical portion having a surface; and the first press-fit member receiving portion formed on the surface of the cylindrical portion.

4. The remote diaphragm assembly of claim 3, wherein:

the mounting portion includes an inner surface defining an opening shaped to mate with the cylindrical portion of the diaphragm member; and the second press-fit member receiving portion is formed on the inner surface of the mounting portion.

5. The remote diaphragm assembly of claim 1, wherein the first and second press-fit receiving portions are annular grooves.

6. The remote diaphragm assembly of claim 1, wherein the press-fit member includes a generally V-shaped cross-section.

7. The remote diaphragm assembly of claim 1, wherein the press-fit member is a compressible annular member.

8. The remote diaphragm assembly of claim 1, wherein the press-fit member is an O-ring.

9. The remote diaphragm assembly of claim 1, wherein the press-fit member is an annular spring.

10. The remote diaphragm assembly of claim 1, wherein the press-fit member provides low-resistance assembly, and high-resistance disassembly of the remote diaphragm assembly.

11. The remote diaphragm assembly of claim 10, wherein:

the diaphragm member and the mounting portion are concentrically aligned; and the press-fit member includes an assembly position in which the press-fit member provides low-resistance to relative axial movement between the diaphragm member and the mounting portion, and a locking position in which the press-fit member provides high-resistance to relative axial movement in a disassembly direction between the diaphragm assembly and the mounting portion.

12. The remote diaphragm assembly of claim 1, wherein one of the diaphragm member and the mounting portion includes a positioning flange that limits relative axial movement therebetween in an assembly direction.

13. A method of assembling a remote diaphragm assembly comprising steps of:

providing a diaphragm member including a flexible diaphragm and a first press-fit member receiving portion;

providing a mounting portion having a second press-fit member receiving portion;

securing a press-fit member to one of the first and second press-fit member receiving portions; and press-fitting the diaphragm member and the mounting portion together whereby the press-fit member is temporarily compressed into an assembly position until it expands to a locking position within a press-fit member cavity formed by the first and second press-fit member receiving portions when aligned.

14. A remote diaphragm assembly for use in coupling a pressure of a process vessel to a process instrument, the process vessel including a process flange and a process port that provides access to the pressure, the remote diaphragm assembly comprising:

a diaphragm member including a base portion and a diaphragm wherein the base portion includes a first annular groove;

a mounting portion adapted to secure the diaphragm member to the process flange and place the diaphragm in fluid communication with the process port, the mounting portion including an opening for receiving the base portion of the diaphragm member therein, the opening including a second annular groove positioned for alignment with the first annular groove to form a cavity; and a flexible connection member disposed within the cavity to connect the diaphragm member and the mounting portion together.

* * * * *